Dec. 16, 1930.   S. N. HURT   1,785,382
WEIGHING SCALE
Filed March 12, 1928
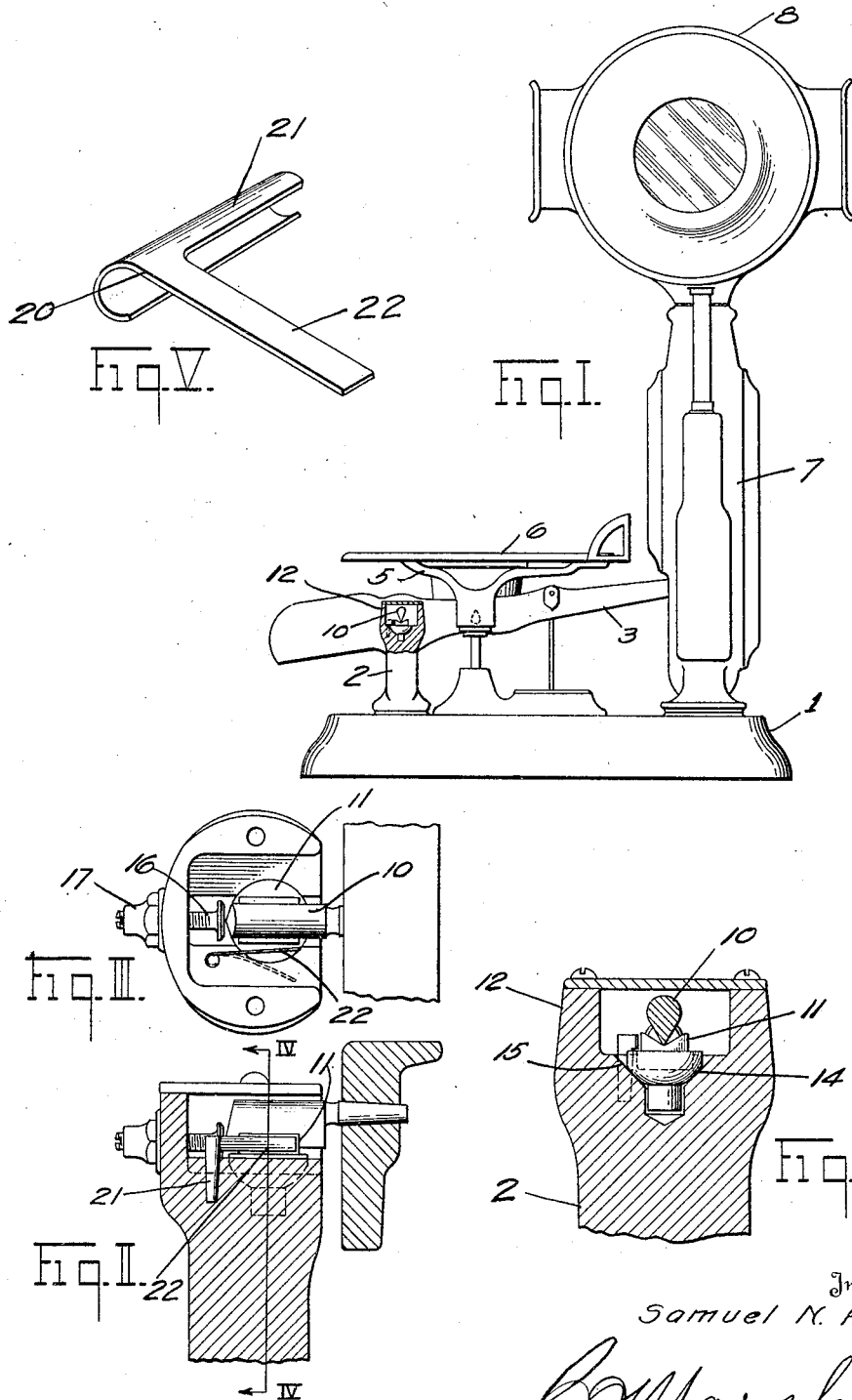
Inventor
Samuel N. Hurt
By C. C. Marshall
Attorney Patented Dec. 16, 1930

1,785,382

UNITED STATES PATENT OFFICE

SAMUEL N. HURT, OF TOLEDO, OHIO, ASSIGNOR TO TOLEDO SCALE COMPANY, OF TOLEDO, OHIO, A CORPORATION OF NEW JERSEY

WEIGHING SCALE

Application filed March 12, 1928. Serial No. 260,862.

This invention relates to weighing scales, and more particularly to retainers for bearings which support pivotal elements of scales.

One of the principal objects of this invention is the provision of means for removably retaining pivot bearings in weighing scales.

Another object is the provision of means for retaining pivot bearings in weighing scales so constructed as to permit a normal limited movement of the bearings.

Another object is to provide a resilient retainer for pivot bearings which permits easy removal of the bearings without deranging the parts.

A further object is the provision of a pivot bearing retainer which may be secured to the scale frame by friction means, without the use of screws or other mechanical securing means.

Still a further object is the provision of a simple pivot bearing retainer which is inexpensive to manufacture and capable of being rapidly produced in large quantities.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a side elevational view of a weighing scale embodying my invention.

Figure II is an enlarged detail sectional view through the scale lever and supporting means.

Figure III is a top plan view of the parts shown in Figure II with the bearing cover removed.

Figure IV is a detail sectional view taken substantially on the line IV—IV of Figure II.

Figure V is an enlarged isometric view of the retainer of my invention.

Referring to the drawings in detail, I have shown my invention in connection with an automatic weighing scale of the counter cylinder type, but it is to be understood that the use of my invention is not limited to scales of this kind, and I will only describe it in such detail as to show the application of my device thereto.

The scale comprises a base 1 supporting at one end a base horn 2 which pivotally supports a main lever 3, the latter being provided with a spider 5 surmounted by a commodity receiving platform 6. The nose end of the lever 3 projects into a housing 7 erected upon the other end of the base and is operatively connected to a suitable load-counterbalancing mechanism (not shown) supported within the housing 7 and to rack and pinion mechanism (not shown) adapted for operating an indicating chart supported in a cylindrical casing 8 mounted upon the upper end of the housing 7.

The lever 3 is provided with fulcrum pivots 10 which are pivotally supported upon V-grooved bearings 11 mounted in the upper ends of the base horn extensions 12 forming integral parts of the base horn 2. The bearings 11 are provided with spherical portions 14 resting in conically-shaped sockets 15 so that the bearings may properly align themselves with the pivots. Thrust screws 16 engaging the ends of the pivots serve to limit the lateral movement of the lever, the screws being held in correct adjustment by means of lock nuts 17.

In order to adequately and simply prevent the displacement of the bearing 11 I have provided a retaining means comprising a clip having a rolled portion 21 forming a tenon which may be driven into a bore in the base horn extension 12. The clip 20 is provided with an extension 22 which is resilient and is easily distorted in a plane at right angles to the axis of the tenon 21, the extension 22 normally projecting above a flattened part of the bearing, thus allowing a limited freedom of movement of the bearing and at the same time preventing an abnormal displacement thereof. When it is desirable to remove the bearing for purposes of repair or replacement or the like, the extension 22 may be distorted as shown in dotted lines in Figure III without disturbing the position of the tenon 21 and the bearing lifted out of its conical socket without further manipulation of parts. The tenon 21 is preferably tapered slightly in order that the retainer may be securely held in the base horn. It is apparent from examination of Figure V that the clip of my invention may be readily fabricated from a flat strip of sheet metal and subsequently formed into the shape illustrated, a construction which is simple and inexpensive and one that is capable of being manufactured by means of mass production methods.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, a frame, a member provided with a pivot, a bearing carried by said frame and supporting said pivot, a resilient clip adapted to secure said bearing against displacement, the parts being arranged so that said clip may be distorted to permit removal of the bearing.

2. In a device of the class described, a frame, a member supported in said frame, a clip secured to said frame for preventing displacement of said member, said clip having a resilient portion which may be temporarily distorted to permit removal of said member.

3. In a device of the class described, a weighing scale frame, a member having a knife edged pivot, a grooved bearing carried in said frame supporting said pivot, a clip having a tenon secured to said frame, said clip having a resilient portion adapted to prevent displacement of said bearing.

4. In a device of the class described, a weighing scale frame, a member having a knife edged pivot, a grooved bearing carried in said frame supporting said pivot, a clip having a tenon secured to said frame, said clip having a resilient portion adapted to prevent displacement of said bearing, said resilient portion being so arranged that it may be distorted to permit removal of said bearing.

5. In a device of the class described, a weighing scale frame, a movable member having a knife edged pivot, a grooved bearing carried by said frame for supporting said pivot, a clip having a tenon frictionally held in a bore in said frame and adapted to prevent displacement of said bearing.

6. In a device of the class described, a weighing scale frame, a movable member having a knife edged pivot, a grooved bearing carried by said frame for supporting said pivot, a clip having a tenon adapted to be driven into a bore in said frame, said clip having an extended portion for preventing displacement of said bearing, said extended portion being distortable in a plane at an angle to the axis of said tenon.

7. In a device of the class described, a weighing scale frame, a movable member having a knife edged pivot, a grooved bearing carried by said frame for supporting said pivot, a clip having a tapered tenon adapted to be driven into a bore in said frame, said clip having a resilient extended portion adapted to prevent displacement of said bearing, the resilient portion of said clip being distortable in a plane at an angle to the axis of said tenon.

SAMUEL. N. HURT.